United States Patent

Alanara et al.

[19]

[11] Patent Number: 6,061,561
[45] Date of Patent: May 9, 2000

[54] CELLULAR COMMUNICATION SYSTEM PROVIDING CELL TRANSMITTER LOCATION INFORMATION

[75] Inventors: Seppo Alanara; Mika Pekka Antero Tarkiainen, both of Oulu, Finland

[73] Assignee: Nokia Mobile Phones Limited, Salo, Finland

[21] Appl. No.: 08/731,289

[22] Filed: Oct. 11, 1996

[51] Int. Cl.[7] .................................................. G01S 3/02
[52] U.S. Cl. .......................... 455/422; 455/456; 455/457; 455/517
[58] Field of Search ................................. 455/456, 457, 455/517, 422; 342/450

[56] References Cited

U.S. PATENT DOCUMENTS

| | | | |
|---|---|---|---|
| 4,891,650 | 1/1990 | Sheffer | 342/457 |
| 5,032,845 | 7/1991 | Velasco | 342/457 |
| 5,430,731 | 7/1995 | Umemoto et al. | 455/54.1 |
| 5,430,760 | 7/1995 | Dent | 375/200 |
| 5,479,482 | 12/1995 | Grimes | 379/59 |
| 5,515,043 | 5/1996 | Berard et al. | 340/988 |
| 5,519,621 | 5/1996 | Wortham | 455/457 |
| 5,519,760 | 5/1996 | Borkowski et al. | 455/456 |
| 5,542,100 | 7/1996 | Hatakeyama | 455/456 |

*Primary Examiner*—Anand S. Rao
*Attorney, Agent, or Firm*—Ohlandt, Greeley, Ruggiero & Perle, L.L.P

[57] ABSTRACT

Methods and apparatus are disclosed for operating a cellular communication network. An exemplary method includes the steps of transmitting a message from a base station (30) to a mobile station (10) located within a cell served by the base station, the message including location information for specifying a geographical location of the base station; storing the location information in the mobile station; originating a predetermined call type with the mobile station and appending the stored location information to a call origination message; and routing the call from the network to the call's destination in conjunction with the appended location information. The location information includes at least one of a latitude and a longitude at which the base station is located and an alphanumeric string that is expressive of a geographical location at which the base station is located. The base station location information is useful in determining a location of the mobile station, such as when an emergency call is made. In a further embodiment of this invention an emergency call is originated by a mobile station in response to the deployment of an air bag in a vehicle wherein the mobile station is located.

30 Claims, 6 Drawing Sheets

| INFORMATION ELEMENT | LENGTH |
|---|---|
| PROTOCOL DISCRIMINATOR | 2 |
| MESSAGE TYPE | 6 |
| SID | 15 |
| NETWORK TYPE | 3 |
| PROTOCOL VERSION | 4 |
| PSID/RSID SET (NOTE 1) | 37 + 17 * N |
| MOBILE COUNTRY CODE | 14 |
| ALPHANUMERIC SID | 12-132 |
| ALPHANUMERIC LOCATION NAME | 80 |
| GEOGRAPHICAL LOCATION | 38 |

FIG. 4

| FIELD | LENGTH |
|---|---|
| PARAMETER TYPE | 4 |
| LONGITUDE, DEGREES | 8 |
| LONGITUDE, MINUTES | 6 |
| LONGITUDE, SECONDS | 6 |
| LONGITUDE, E/W | 1 |
| LATITUDE, DEGREES | 7 |
| LATITUDE, MINUTES | 6 |
| LATITUDE, SECONDS | 6 |
| LATITUDE, S/N | 1 |

FIG. 5

| VALUE | FUNCTION |
|---|---|
| 0 | EAST OF GREENWICH |
| 1 | WEST OF GREENWICH |

FIG. 6

| VALUE | FUNCTION |
|---|---|
| 0 | SOUTH OF EQUATOR |
| 1 | NORTH OF EQUATOR |

CELLULAR COMMUNICATION SYSTEM PROVIDING CELL TRANSMITTER LOCATION INFORMATION

FIELD OF THE INVENTION

This invention relates generally to cellular communication systems and to subscriber mobile stations that operate within such systems.

BACKGROUND OF THE INVENTION

Cellular communication systems, such as those providing cellular telephone and personal communicator service, are characterized by overlapping cells each having a cell site transmitter. The cell site transmitters are often referred to as base stations. Such cellular communication systems include public systems that serve a city or region, residential systems that serve a home or office, and private systems that serve, by example, an office building or a hotel. The cells of the latter two systems are typically much smaller than the cells of the public system, which may have a diameter of several kilometers. A typical mobile station or user transceiver terminal is capable of movement between adjacent cells, with an ongoing communication connection being handed off between base stations as the mobile station leaves the coverage area of one cell and enters the coverage area of another cell.

While in most instances the exact geographical location of the base stations or mobile stations is of little importance, it can be appreciated that in certain situations, such as emergency situations, this information may become very important. By example, if a user were to place an emergency call (e.g., a 911 call), then an ability to accurately determine the location of the user can aid in dispatching emergency services to the user. This is especially true when calls are received from highway travelers who may be unfamiliar with the region from where they are making the emergency call, and who may thus be unable to give their location. Furthermore, in some circumstances the user may be physically incapable of communicating their location when placing an emergency call. Unfortunately, many conventional cellular communication systems do not provide a mechanism to determine and report the user's location with a degree of specificity that would aid in rapidly locating the user.

Another useful feature that is not adequately addressed by conventional cellular communication systems is an ability to inform a mobile station user of an approximate location of the user relative to a geographical area within which a base station is situated. For example, it would be useful to indicate, especially at night or in inclement weather, that the user is passing through or close to a certain town, or is located near to a major highway intersection. Currently specified cellular communication systems do not address this need.

OBJECTS OF THE INVENTION

It is thus a first object of this invention to provide an improved cellular communication system that overcomes the foregoing and other problems.

It is a second object of this invention to provide a cellular communication system wherein a base station is enabled to communicate its geographical location to a mobile station.

It is a further object of this invention to provide a cellular communication system wherein a base station is enabled to communicate its geographical location to a party called by the mobile station.

It is another object of this invention to provide a cellular communication system wherein a mobile station and/or base station is enabled to accurately determine a distance between the base station and the mobile station, thereby enabling accurate time alignment, burst length, power settings, and other functions to be implemented based on the determined distance between the base station and the mobile station.

It is one further object of this invention to provide a cellular communications systems wherein a vehicular mobile station is enabled to automatically place an emergency call in response to a triggering incident, such as the deployment of an air bag during a collision.

SUMMARY OF THE INVENTION

The foregoing and other problems are overcome and the objects of the invention are realized by methods and apparatus in accordance with embodiments of this invention.

A method is disclosed for operating a cellular communication network, comprising the steps of transmitting a message from a base station to a mobile station located within a cell served by the base station, the message including location information for specifying a geographical location of the base station; storing the location information in the mobile station; originating a predetermined call type with the mobile station and appending the stored location information to a call origination message; and routing the call from the network to the call's destination in conjunction with the appended location information.

The location information includes at least one of a latitude and a longitude at which the base station is located and an alphanumeric string that is expressive of a geographical location at which the base station is located.

In accordance with another method for operating a cellular communication network there is disclosed the steps of transmitting a message from a base station to a mobile station located within a cell served by the base station, the message including location information for specifying a geographical location of the base station; storing the location information in the mobile station; originating a call with the mobile station; routing the call from the network to the call's destination; at the call's destination, originating a message to the mobile station to interrogate the mobile station for the stored location information; and in response to receiving the interrogation message at the mobile station, transmitting a message that includes the stored location information.

In accordance with a further method for operating a cellular communication network there is disclosed the steps of originating a predetermined call type with the mobile station; detecting at a base station that serves a cell within which the mobile station is located that the mobile station has originated the predetermined call type; and in response to detecting the predetermined call type, routing the call from the base station to the call's destination while appending location information to the routed call for specifying a geographical location of the base station.

In accordance with a still further method for operating a cellular communication network there is disclosed the steps of transmitting a message from a base station to a mobile station located within a cell served by the base station, the message including location information for specifying a geographical location of the base station; determining a current geographical location of the mobile station; calculating a distance to the base station from the mobile station in accordance with the determined current location of the mobile station and in accordance with the location information received from the base station; calculating time alignment information in the mobile station for adjusting an arrival time of a burst, transmitted by the mobile station, at the base station's receiver; and setting the mobile station's transmitted burst timing in accordance with the calculated time alignment information.

In this method the mobile station may also determine instead of, or in conjunction with, the time alignment information whether to transmit a normal length burst or a shortened burst in accordance with the calculated distance to the base station.

In a further embodiment of this invention there is disclosed a method for operating a cellular communication system, the method including the steps of (a) transmitting a message from a base station to a mobile station located within a vehicle, the vehicle being disposed within a cell served by the base station, the message including location information for specifying a geographical location of the base station; (b) storing the location information within a memory device of the mobile station; and (c) in response to an activation of a passenger safety system of the vehicle, such as an air bag system, originating an emergency call from the mobile station, the emergency call including the stored location information. The step of originating includes the steps of determining a current position of the vehicle from a vehicular navigation system; and including the determined current position with the stored location information. A further step of the method includes other information with the stored location information in the originated emergency call, the other information being descriptive of a user of the mobile station, such as the user's name, social security number, blood type, etc. In this embodiment the other information is also stored in the memory device of the mobile station.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
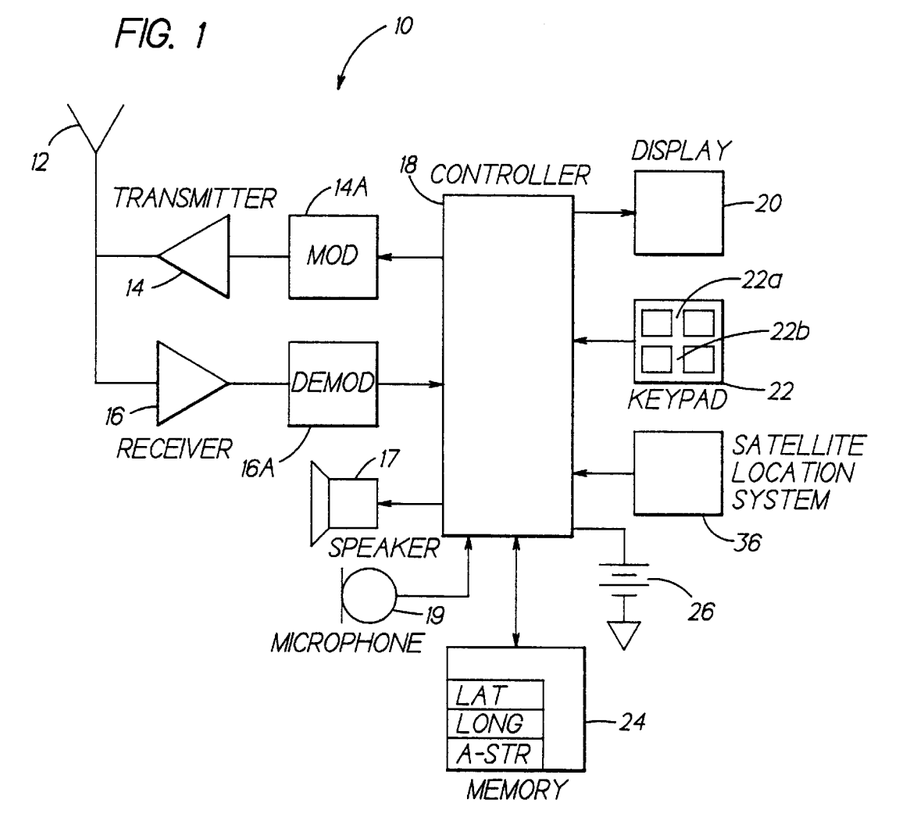
FIG. 1 is a block diagram of a mobile terminal that is constructed and operated in accordance with this invention.
Figure 2:
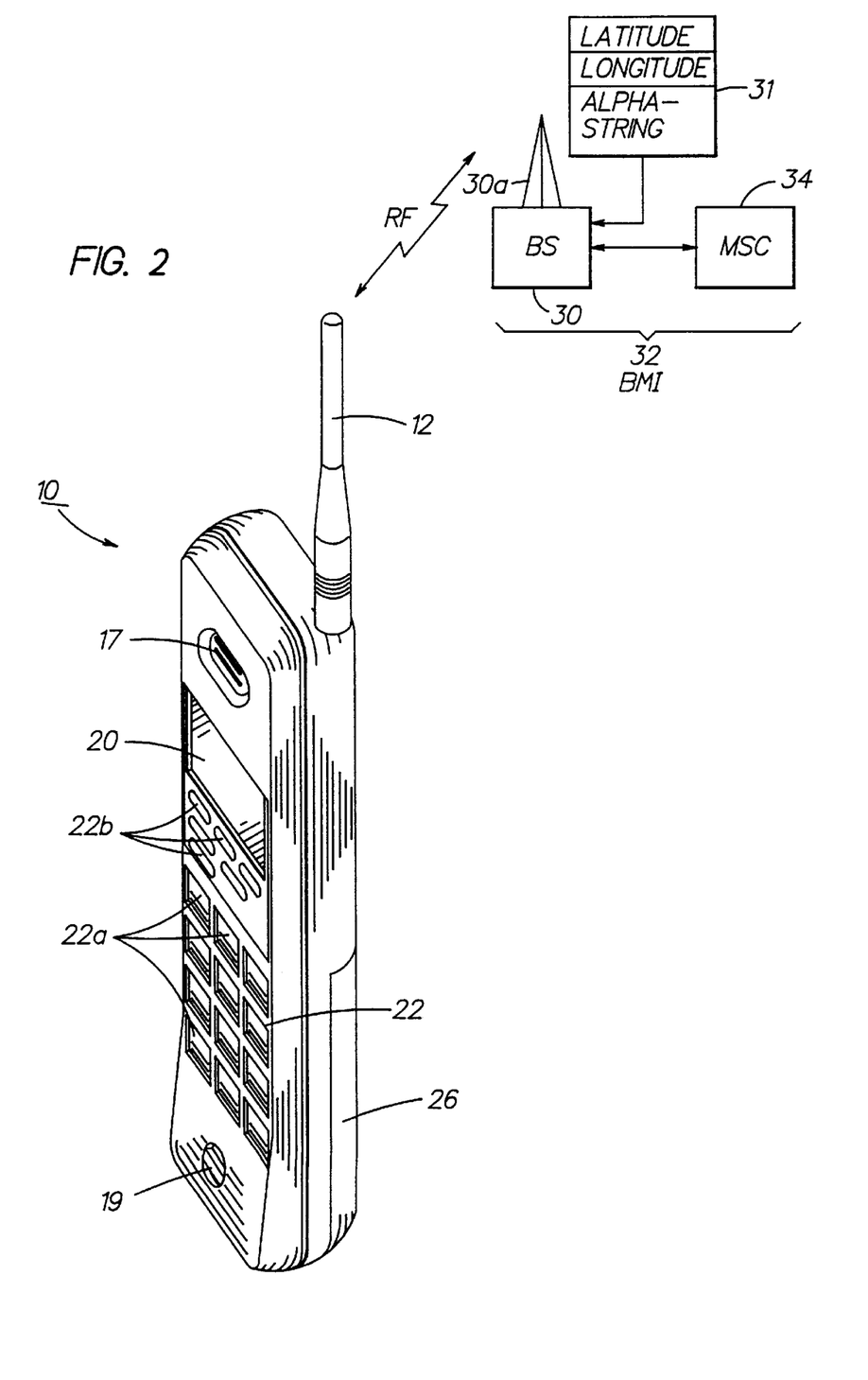
FIG. 2 is an elevational view of the mobile terminal shown in FIG. 1, and which further illustrates a cellular communication system to which the mobile terminal is bidirectionally coupled through wireless RF links.

Reference is made to FIGS. 1 and 2 for illustrating a wireless user or mobile station 10 such as, but not limited to, a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center (MSC)/and Internetworking Function, or BMI 32, that includes a Mobile Switching Center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signaling information in accordance with the air interface standard of the applicable cellular system, and also user speech and/or user generated data. The air interface standard is assumed for this invention to include a Time Division Multiple Access (TDMA) physical and logical frame structure of a type that is specified in IS-136.1 and IS-136.2, Rev. A, although the teaching of this invention is not intended to be limited only to this specific structure, or for use only with a digital IS-136 compatible mobile station, or for use only in TDMA type systems.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM and IS-95 (CDMA). Narrow-band AMPS (NAMPS), as well as TACS, mobile stations may also benefit from the teaching of this invention. It should thus be clear that the teaching of this invention is not to be construed to be limited to any one particular type of mobile station or air interface standard.

The operating program in the memory 24 includes routines to present messages and message-related functions to the user on the display 20. The memory 24 also includes routines for implementing the methods described below in relation to FIGS. 7–9. The BMI 32 is assumed to include a controller and memory for implementing the BMI portion of these methods.

In accordance with this invention the BMI 32 includes a memory 31 for storing information expressive of a geographical location of the base station 30. In a preferred embodiment of this invention the location is stored as latitude (degrees, minutes, seconds), longitude (degrees, minutes, seconds), and as an alphanumeric string, e.g., "Smalltown, Texas", "Southwest Dallas", "Empire State Building, Midtown Manhattan", "Intersection I-495 and Route 202", etc. When used in a private cellular network the alphanumeric string may convey a name and location of the private system provider, such as a name of a hotel or corporation. Microcells within the private (or residential) systems can also be separately identified, e.g., "Hotel Name, Floor 12".

In other embodiments of the invention only the latitude and longitude may be used, or only the alphanumeric string may be used. The location information can be programmed into the memory 31 at the time the base station 30 is installed or placed into service. The latitude and longitude is typically accurately known a priori, or can be determined by well-known surveying or satellite location techniques. By "accurately known", it is assumed for the purposes of this invention that the location is known to a precision that is suitable for distinguishing the location from the locations of other base stations. In a preferred embodiment of this invention the location information is expressed with a resolution given in degrees, minutes, and seconds of latitude and longitude. In other embodiments the location could be expressed in, by example, tenths or hundredths of a second resolution.

Figure 3:
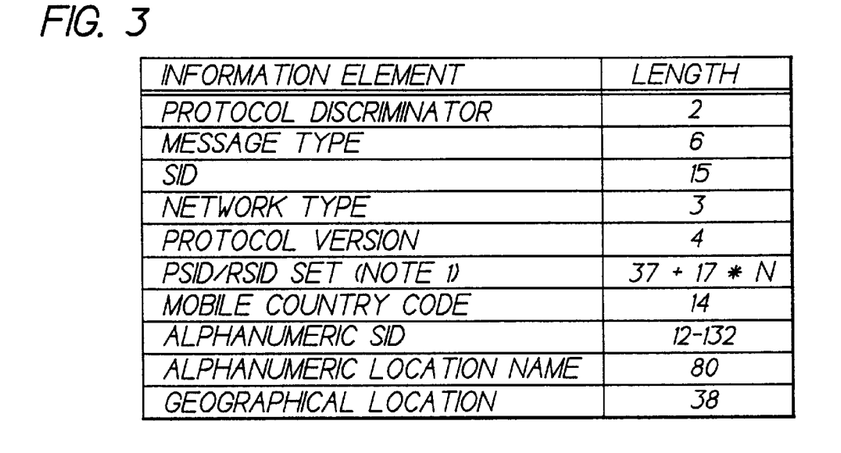
FIGS. 3–6 illustrate various exemplary message formats for communicating base station location information to the mobile station.
Figure 4:
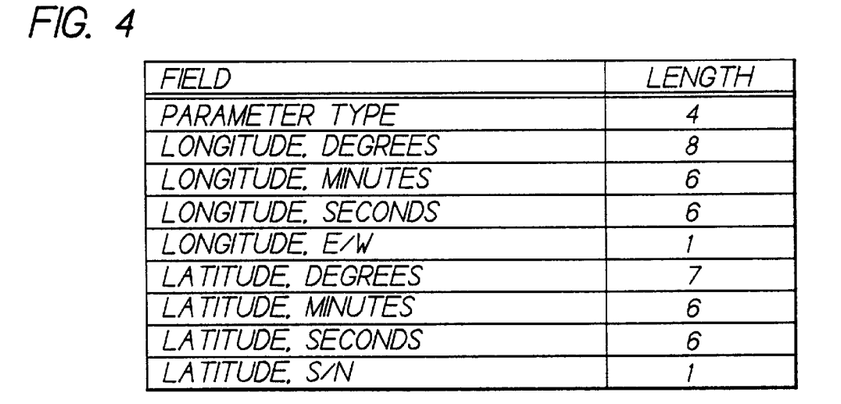
Figure 5:
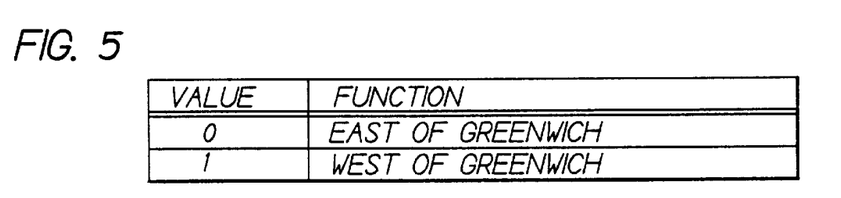
Figure 6:
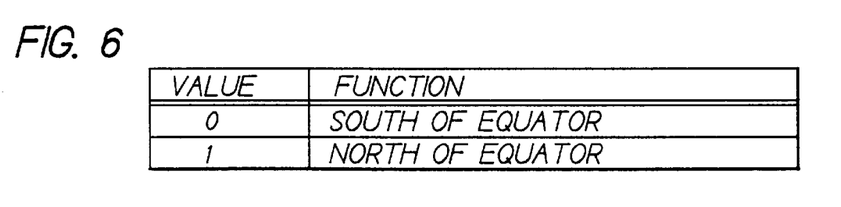

In a preferred embodiment of this invention the air interface standard (i.e., IS-136) includes a System Identity message (IS-136.1, Rev. A, Section 6.4.1.1.1.5). As is illustrated in FIG. 3, the System Identity message is modified to include an 80 byte Alphanumeric Location Name field and a 38 byte Geographical Location field. The format of the Geographical Location field is illustrated in FIG. 4, the format of the Longitude, E/W sub-field is illustrated in FIG. 5, and the format of the Latitude, S/N sub-field is illustrated in FIG. 6. It should be noted that the value of the Longitude, degrees sub-field is 0–180 degrees, and the Longitude, E/W field is used as a sign. It should be further noted that the value of the Latitude, degrees sub-field is 0–90 degrees, and the Latitude, S/N field is used as a sign.

The base station 30 is enabled to transmit the stored location information as part of the System Identity message to mobile stations 10 that are within the cell serviced by the base station 30. Referring also to FIG. 1, the mobile station 10 stores the received location information in a Read/Write portion of the memory 24 in predetermined latitude (LAT), longitude (LONG), and alphanumeric string (A-STR) locations. When the mobile station 10 is handed off to another base station 30, the new base station's location information is preferably written over the location information of the previous base station. When monitoring several base stations to determine a best base station to service the mobile station, the mobile station 10 may employ multiple memory locations for storing location information received from each of the monitored base stations.

In accordance with this invention new information elements are thus added to the Digital Control Channel (DCCH) broadcast information. The new information elements specify the geographical location of the cell transmitter. The geographical location is identified with at least one of an alphanumeric string (name of city, town, suburb, village, etc.) and a binary coded location in degrees (latitude deg:min:sec N/S, longitude deg:min:sec E/W).

In one aspect of this invention the location information may be interrogated by a 911 operator from the mobile station 10, using a request message that forms a part of the Short Message Service (SMS)/Paging Channel (PCH)/Access Response Channel (ARCH), or SPACH message set of IS-136.1. Upon a receipt of this request message the controller 18 of the mobile station 10 accesses the memory 24 and transmits the stored base station location information to the 911 operator.

In another aspect of this invention the stored location information, such as the alphanumeric information, is displayed to the user on the display 20. In this manner the user is enabled to read the location information to the 911 operator, thereby indicating an approximate location of the user. By viewing the displayed location information the user can thus determine the location of the cell where the mobile phone is being serviced. Usually in urban areas the cell size is small, and thus the user enabled to provide fairly accurate location information in cases of emergency.

The location information of the serving cell can also be used to verify that the mobile station 10 stays on the best available cell, which is typically the cell having a base station 30 that is nearest to the mobile station 10. If the mobile station 10 is also equipped with or connected to a satellite location system, the mobile station 10 can then calculate, using conventional techniques, a distance to the base station 30 of the serving cell. The calculated distance information can be used, either alone or in conjunction with received signal strength (RSS) information, to calculate, in the mobile station 10, an accurate time alignment value. The calculated time alignment value can then be used when making a DCCH random access. A mobile station 10 using RACH time alignment may thus also use a normal length RACH burst when in a cell that uses an abbreviated burst length.

Further in this regard, reference can be made to Section 2.1.3.3.5 of IS-136.2, Rev. A. In general, time alignment is a process of controlling the time of TDMA time slot burst transmissions from the mobile station 10 by advancing or retarding the mobile station transmit burst so that it arrives at the base station receiver in the proper time relationship to other time slot burst transmissions. An error in time alignment is caused by the arrival of power from two different mobile station transmitters simultaneously at the base station receiver. This in turn causes errors in both signals. The overlap in transmission occurs at the beginning or end of a time slot. Upon detecting an overlap condition, the base station 32 sends an appropriate Physical Layer Control message containing a time alignment information element to the mobile station 10 using the appropriate forward signaling channel.

In IS-136, the format of the Physical Layer Control message is described in Section 3.7.3.1.3.2.5. The time adjustment parameter in that message provides for advancing or retarding the time of the mobile station transmit burst in units of ½ symbols. Upon receipt of a Physical Layer Control message containing a time alignment information element, the mobile station 10 change its timing in one adjustment.

At certain times it may be necessary for a mobile station 10, while operating on a digital traffic channel, to transmit a shortened burst during its slot interval (see Section 2.1.3.3.5.4), so as to avoid collisions at the base station 30 between the mobile station's burst slot and the burst of a neighboring slot. This collision of neighboring bursts at the base station is due to the mobile station not having the proper time alignment information corresponding to its distance from the base station.

Estimated time alignment information is also used when handing off the mobile station 10 from one digital traffic channel to another. For smaller diameter cells, the estimated time alignment information is used to adjust the transmit timing of the mobile station 10 so that there are be no burst collisions at the base station 30. For systems with sector to sector handoff, the estimated time alignment information is also used to adjust the mobile station transmit timing so that there are no burst collisions at the base station 30. For larger diameter cells, however, the estimated time alignment information may not be accurate enough to avoid burst collisions at the base station 30.

In accordance with an aspect of this invention, and assuming that the mobile station 10 is enabled to determine its location, such as from a global positioning system (GPS) satellite location subsystem 36 (see FIG. 1), the mobile station 10 is enabled to accurately determine the distance between the mobile station's transmitter antenna 12 and the base station's receive antenna 30b (FIG. 2). The mobile station 10 is then enabled to calculate, using a technique that is similar or identical to techniques known for the base site equipment, accurate time alignment information, as opposed to receiving time alignment information from the base station 30. In this manner the mobile station 10 is enabled to avoid collisions with bursts transmitted by other mobile stations. The use of unnecessary shortened bursts may also be eliminated, thereby increasing the amount of information that can be transmitted to the base station 30 in one burst. This makes more efficient use of the random access channel, in that a conventional two or more shortened burst transmission may be made, when possible, in fewer bursts.

The calculated distance information can also be used by the mobile station 10 when determining an initial power level with which to transmit an access request, in that generally less transmitter power is required when the mobile station 10 is nearer to the base station 30. Such power calculations may also be of benefit for CDMA mobile stations, such as those specified by IS-95, wherein an equalization of received powers at the base station, for mobile stations sharing the spectrum, is an important consideration.

Figure 7:
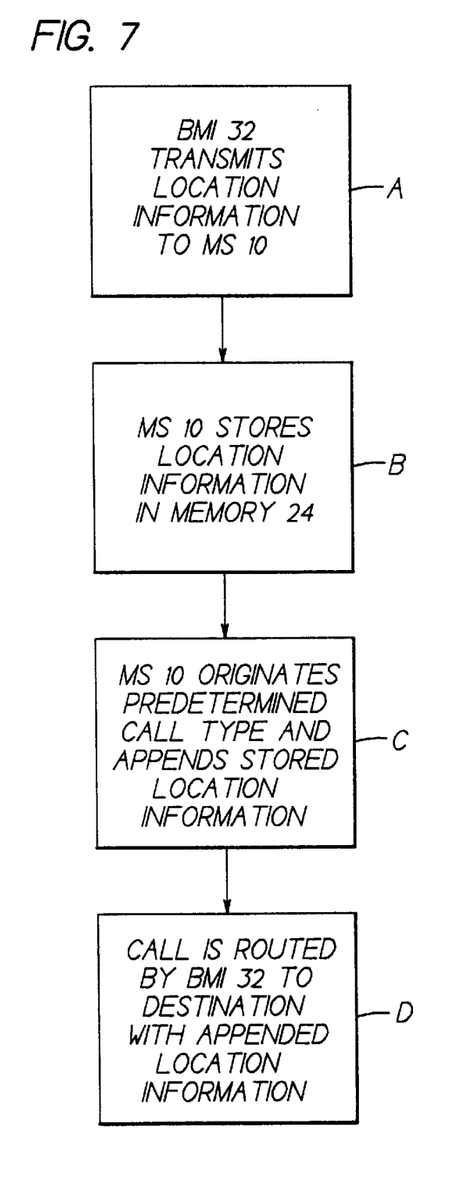
FIGS. 7, 8 and 9 are logic flow diagrams that illustrate methods of this invention.
Figure 8:
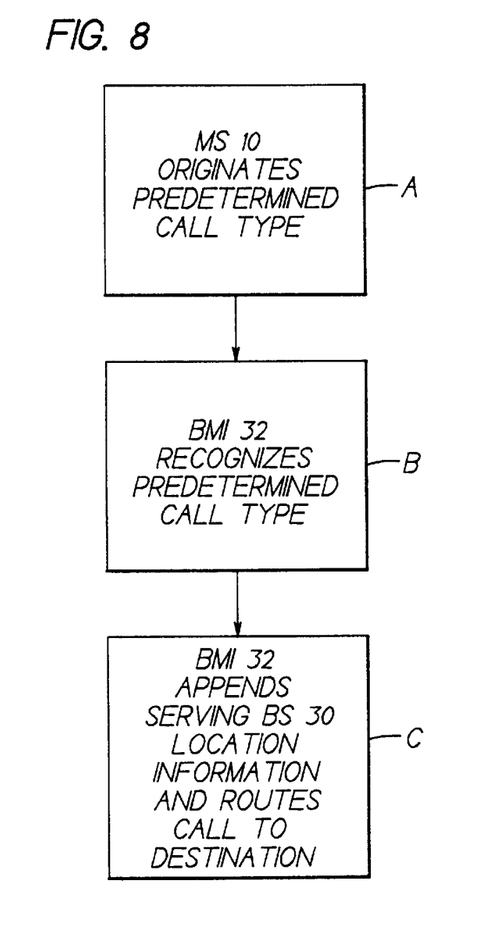
Figure 9:
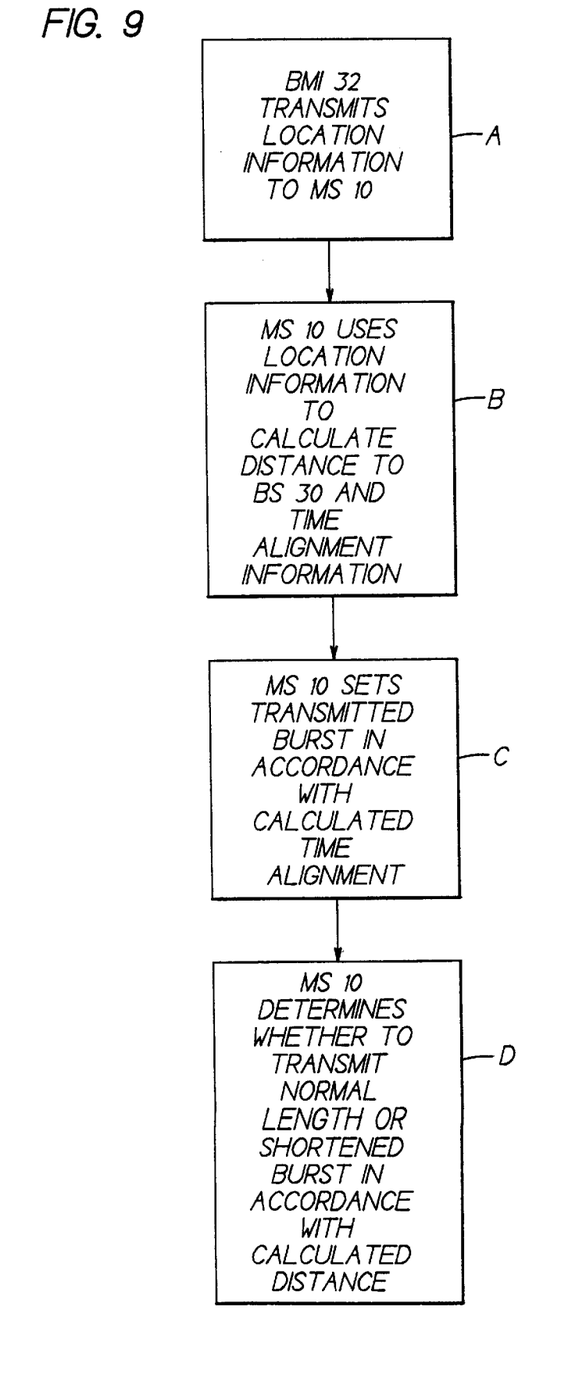

Reference is now made to FIGS. 7, 8 and 9 for illustrating three further methods in accordance with the teaching of this invention.

In FIG. 7, at Block A, the BMI 32 transmits the base station location information to the mobile station 10. At Block B the mobile station 10 stores the location information in memory 24. At Block C the mobile station 10 originates a predetermined call type (e.g., a 911 call) and appends the stored location information to the call origination message. At Block D the call is routed by the BMI 32 to the call's destination (e.g., a 911 operator) along with the appended location information. The receiving party is thus enabled to automatically determine that the mobile station 10 is located within a cell served by the base station 30, and thus has an indication of the geographical location of the user.

This method can be modified as described above such that the receiving party uses a message to interrogate the mobile station 10 for the location information, after which the mobile station 10 transmits the location information using an appropriate response message.

In accordance with another method of this invention, and referring to FIG. 8, at Block A the mobile station 10 originates the predetermined call type (e.g., a 911 call). At Block B the BMI 32 recognizes that the mobile station 10 has originated the predetermined call type. At Block C the BMI 32 accesses the memory 31 and appends the location of the serving base station 30 to the call and routes the call to the destination. As in the method of FIG. 7, the receiving party is thus enabled to automatically determine that the mobile station 10 is located within a cell served by the base station 30.

In accordance with a further method of this invention, and referring to FIG. 9, at Block A the BMI 32 transmits the location information to the mobile station 10. At Block B the mobile station 10 uses the location information to calculate the distance to the base station 30 in accordance with a current location of the mobile station 10. The mobile station's location can be determined by, for example, the satellite location system 36, or any other suitable position determining means. Based on the calculated distance the mobile station 10 then calculates the time alignment information required to adjust the arrival time of the mobile station's transmitted burst at the base station's receiver. At Block C the mobile station 10 sets its transmitted burst in accordance with the calculated time alignment information. At Block D the mobile station 10 may optionally determine whether to transmit a normal length burst or a shortened burst in accordance with the calculated distance to the base station 30. It is also within the scope of the invention to use the calculated distance to first make the normal length/shortened burst determination, and then optionally perform the time alignment process.

Although described in the context of preferred embodiments, it should be realized that a number of modifications to these teachings may occur to one skilled in the art. By example, the latitude and longitude can be expressed with any degree of precision, and is not limited for expression in only a degree:minute:second format. Furthermore, for the case where the mobile station 10 includes the satellite location system, the mobile station 10 is enabled to transmit its own location when originating a call or in response to being interrogated by another party, and need not transmit any location information received from the base station 30.

Figure 10:
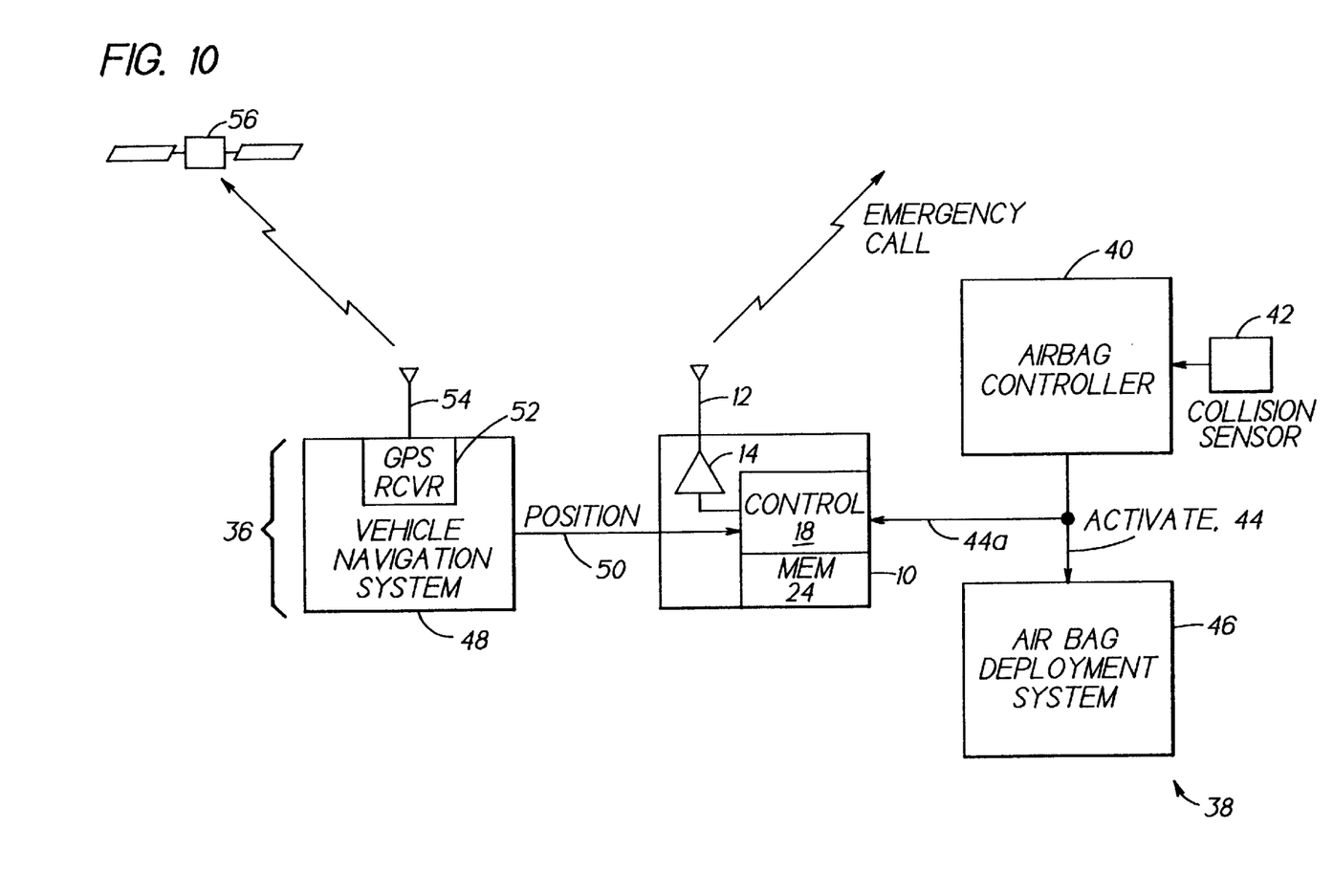
FIG. 10 is a block diagram of an embodiment of this invention wherein a cellular telephone carried within a vehicle is coupled to a vehicle air bag deployment system for automatically originating an emergency call in response to a deployment of an air bag, the emergency call including vehicle location information.

FIG. 10 is a block diagram of a further embodiment of this invention wherein the cellular telephone mobile station 10 carried within a vehicle is coupled to a vehicle air bag system 38 for automatically originating an emergency call in response to a deployment of an air bag, wherein the emergency call includes at least a location of the vehicle.

More particularly, the vehicle includes the air bag controller 40 having an input connected to a collision sensor 42. In response to a signal from the sensor 42 the controller 40 generates an air bag activate signal 44. The activate signal 44 is connected to an air bag deployment system 46 which responds to the activate signal by inflating, i.e., deploying, one or more air bags within the passenger compartment of the vehicle.

In accordance with this embodiment of the invention the same or a different activate signal is coupled over a link 44a to the controller 18 of the mobile station 10. The link 44a may be a wired link, an infrared link, a low power RF link, or any suitable mechanism for coupling the controller 18 to the output of the air bag controller 44. In any case, the controller 18 becomes aware of the deployment of the vehicle's air bag(s) during a collision. In response to the activate signal being asserted, the controller 18 automatically originates an emergency or distress call to an emergency center, such as a 911 center, via the transmitter 14 and antenna 12. Further in accordance with this invention, the emergency call includes position information for locating the vehicle, and may also include other information that is programmed into the memory 24, such as a name, social security number, blood type, primary physician, etc., of a user of the mobile station 10.

In one embodiment the position information is obtained, as described above, from the location information that is transmitted from the base station 30 and stored in the memory 24 of the mobile station (see FIG. 7). In a further embodiment of this invention the base station 30 may append the location information to the originated emergency call (see FIG. 8). In a still further embodiment of this invention the satellite location system 36 of FIG. 1 is also interrogated by the controller to determine a current or last position of the vehicle, and this position information is appended to the emergency call by the controller 18, along with the stored base station location information. In this latter embodiment the vehicle includes a vehicle navigation system 48 having a Global Positioning System (GPS) satellite receiver 52 that receives, via antenna 54, transmissions from one or more GPS satellites 56. The vehicle navigation system 48 may further include an inertial, dead reckoning, or other type of navigation system for maintaining a current position of the vehicle, wherein the GPS position information is employed for periodically updating the vehicle's position. Alternatively, the GPS receiver 52 may be the vehicle's primary navigation information system.

Although described specifically in the context of an air bag deployment system, it can be appreciated that this embodiment of the invention can originate an emergency call in response to a signal from any type of vehicle passenger safety system. By example, if the vehicle is equipped with a smoke, heat, or flame sensor, the output of the sensor can be coupled to the controller 18 for initiating the origination of the emergency call.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a cellular communication network, comprising the steps of:
    transmitting a wireless message from a base station to a mobile station located within a cell served by the base station, the message comprising location information for specifying a geographical location of the base station;
    storing the location information in the mobile station;
    originating a predetermined call type with the mobile station and appending the stored location information to a call origination message; and
    routing the call from the network to the call's destination in conjunction with the appended location information;
    wherein the location information is comprised of an alphanumeric string that is descriptive of a name of a place where the base station is installed; and further comprising a step of
        displaying at least a portion of the stored alphanumeric string to a user of the mobile station.

2. A method as set forth in claim 1, wherein the location information further comprises a latitude and a longitude at which the base station is located.

3. A method for operating a cellular communication network, comprising the steps of:
    transmitting a wireless message from a base station to a mobile station located within a cell served by the base station, the message comprising location information for specifying a geographical location of the base station;
    storing the location information in the mobile station;
    originating a call with the mobile station;
    routing the call from the network to the call's destination;
    at the call's destination, originating a message to the mobile station to interrogate the mobile station for the stored location information; and
    in response to receiving the interrogation message at the mobile station, transmitting a message that includes the stored location information;
    wherein the location information comprises an alphanumeric string that is descriptive of a name of a place where the base station is installed; and further comprising a step of
        displaying at least a portion of the stored alphanumeric string to a user of the mobile station.

4. A method as set forth in claim 3, wherein the location information further comprises a latitude and a longitude at which the base station is located.

5. A method for operating a cellular communication network, comprising the steps of:
    originating a predetermined call type with a mobile station;
    detecting at a base station that serves a cell within which the mobile station is located that the mobile station has originated the predetermined call type; and
    in response to detecting the predetermined call type, routing the call from the base station to the call's destination while appending location information to the routed call for specifying a geographical location of the base station, the location information being appended to the routed call external to the mobile station and prior to the call's arrival at the call's destination.

6. A method as set forth in claim 5, wherein the location information includes a latitude and a longitude at which the base station is located.

7. A method as set forth in claim 5, wherein the location information includes an alphanumeric string that is expressive of a geographical location at which the base station is located.

8. A method for operating a cellular communication network, comprising the steps of:
    transmitting a wireless message from a base station to a mobile station located within a cell served by the base station, the message including location information for specifying a geographical location of the base station;
    determining a current geographical location of the mobile station;
    calculating a distance to the base station from the mobile station in accordance with the determined current location of the mobile station and in accordance with the location information received from the base station;
    calculating time alignment information in the mobile station for adjusting an arrival time of a burst, transmitted by an RF transmitter of the mobile station, at the base station's receiver, wherein the time alignment information is calculated in accordance with the calculated distance; and
    setting the mobile station's transmitted burst timing in accordance with the calculated time alignment information so as to reduce a probability that the transmitted burst will arrive at the base station's receiver during a time that a transmitted burst from another mobile station arrives at the base station's receiver.

9. A method as set forth in claim 8, and further comprising the step of:

determining in the mobile station whether to transmit a normal length burst or a shortened burst in accordance with the calculated distance to the base station.

10. A method for operating a cellular communication network, comprising the steps of:

transmitting a wireless message from a base station to a mobile station located within a cell served by the base station, the message including location information for specifying a geographical location of the base station;

determining a current geographical location of the mobile station;

calculating a distance to the base station from the mobile station in accordance with the determined current location of the mobile station and in accordance with the location information received from the base station; and determining in the mobile station whether to transmit a normal length burst or a shortened burst in accordance with the calculated distance to the base station.

11. A method as set forth in claim 10, and further comprising the steps of:

calculating time alignment information in the mobile station for adjusting an arrival time of a burst, transmitted by the mobile station, at the base station's receiver; and setting the mobile station's transmitted burst timing in accordance with the calculated time alignment information.

12. A cellular communication system having at least one base station that serves at least one mobile station that is located within a cell defining a service area of the base station, said system comprising:

a first memory for storing location information for specifying a geographical location of the base station;

means for transmitting a wireless message to said mobile station, the message including said location information; and a second memory in said mobile station for storing said location information that is received from said base station;

wherein the location information is comprised of an alphanumeric string that is descriptive of a name of a place where the base station is installed; and further comprising a display for displaying at least a portion of the stored alphanumeric string to a user of the mobile station.

13. A system as set forth in claim 12, wherein said mobile station further comprises means for originating a predetermined call type and for appending the stored location information to a call origination message for the predetermined call type, and wherein said system includes means for routing the call to the call's destination in conjunction with the appended location information.

14. A system as set forth in claim 12, wherein said mobile station further comprises means for originating a telephone call, wherein said system includes means for routing the telephone call to the call's destination, and wherein said mobile station is responsive to a received interrogation message for transmitting a message that includes the stored location information.

15. A system as set forth in claim 12, wherein said mobile station further comprises:

means for determining a current geographical location of the mobile station;

means for calculating a distance to the base station from the mobile station in accordance with the determined current location of the mobile station and in accordance with the location information received from the base station; and means for calculating time alignment information for adjusting an arrival time of a burst, transmitted by the mobile station, at the base station's receiver and for setting the mobile station's transmitted burst timing in accordance with the calculated time alignment information.

16. A system as set forth in claim 12, wherein said mobile station further comprises:

means for determining a current geographical location of the mobile station;

means for calculating a distance to the base station from the mobile station in accordance with the determined current location of the mobile station and in accordance with the location information received from the base station; and means for determining whether to transmit a normal length burst or a shortened burst in accordance with the calculated distance to the base station.

17. A system as set forth in claim 12, wherein the location information is further comprised of a latitude and a longitude at which the base station is located.

18. A cellular communication system having at least one base station that serves at least one mobile station that is located within a cell defining a service area of the base station, said system comprising:

a memory, disposed external to said mobile station, for storing location information for specifying a geographical location of the base station;

said mobile station comprises means for originating a predetermined call type and for transmitting a call origination message to the base station; and wherein said system further comprises means, coupled to said memory, for routing the call to the call's destination in conjunction with appended base station location information that is retrieved from said memory, the base station location information being appended to the routed call external to the mobile station and prior to the call's arrival at the call's destination.

19. A system as set forth in claim 18, wherein the location information includes at least one of a latitude and a longitude at which the base station is located or an alphanumeric string that is expressive of the geographical location at which the base station is located.

20. A mobile station operable with a base station for conducting bidirectional wireless communication, said mobile station comprising:

means for determining a current geographical location of the mobile station;

means for calculating a distance to the base station from the mobile station in accordance with the determined current location of the mobile station and in accordance with location information received from the base station, the location information specifying a geographical location of the base station; and means for calculating time alignment information for adjusting an arrival time of a burst, transmitted by the mobile station, at the base station's receiver and for setting the mobile station's transmitted burst timing in accordance with the calculated time alignment information, wherein the time alignment information is calculated in accordance with the calculated distance.

21. A mobile station operable with a base station for conducting bidirectional wireless communication, said mobile station comprising:

means for determining a current geographical location of the mobile station;

means for calculating a distance to the base station from the mobile station in accordance with the determined current location of the mobile station and in accordance with location information received from the base station, the location information specifying a geographical location of the base station; and means for determining whether to transmit a normal length burst or a shortened burst in accordance with the calculated distance to the base station.

22. A method for operating a cellular communication system, comprising the steps of:

transmitting a wireless message from a base station to a mobile station located within a cell served by the base station, the message including location information for specifying a geographical location of the base station;

determining a current geographical location of the mobile station;

calculating a distance to the base station from the mobile station in accordance with the determined current location of the mobile station and in accordance with the location information received from the base station; and determining, in the mobile station and in accordance with the calculated distance, at least one timing related characteristic or power related characteristic of a signal to be transmitted by the mobile station to the base station.

23. A method as set forth in claim 22, wherein the characteristic includes at least one of a time alignment of a burst, a length of a burst, and a power level at which the mobile station transmits the burst.

24. A method for operating a cellular communication system, comprising the steps of:

transmitting a wireless message from a base station to a mobile station located within a vehicle, the vehicle being disposed within a cell served by the base station, the message including location information for specifying a geographical location of the base station, the location information comprising an alphanumeric string that is descriptive of a name of a place where the base station is installed;

storing the location information within a memory device of the mobile station; and in response to an activation of a passenger safety system of the vehicle, originating an emergency call from the mobile station, the emergency call including the stored location information.

25. A method as set forth in claim 24, wherein the passenger safety system includes an air bag system.

26. A method as set forth in claim 24, wherein the step of originating includes the steps of:

determining a current position of the vehicle from a vehicular navigation system; and including the determined current position with the stored location information.

27. A method as set forth in claim 24, and further comprising a step of including other information with the stored location information, the other information being descriptive of a user of the mobile station.

28. A method as set forth in claim 27, wherein the other information is also stored in the memory of the mobile station.

29. A method for operating a non-public cellular communication system of a type that comprises a plurality of microcells each serviced by a local base station, comprising the steps of:

transmitting a message from a first one of the local base stations to a mobile station located within a first microcell serviced by the first one of the local base stations, the message comprising a first alphanumeric string that is descriptive of a name of an area serviced by the first one of the local base stations;

receiving the message and storing the first alphanumeric string in a memory of the mobile station;

displaying at least a portion of the first alphanumeric string to a user of the mobile station;

in response to the mobile station moving from the first microcell to a second microcell, transmitting a message to the mobile station from a second one of the local base stations that services the second microcell, the message comprising a second alphanumeric string that is descriptive of a name of an area serviced by the second one of the local base stations;

receiving the message and storing the second alphanumeric string in the memory of the mobile station; and displaying at least a portion of the second alphanumeric string to the user of the mobile station.

30. A method as in claim 29, wherein the step of storing the second alphanumeric string includes a step of overwriting the first alphanumeric string.

* * * * *